(No Model.) 4 Sheets—Sheet 1.
C. F. MARVIN & J. P. FRIEZ.
DEVICE FOR STARTING OR STOPPING TIME INDICATORS.
No. 533,657. Patented Feb. 5, 1895.
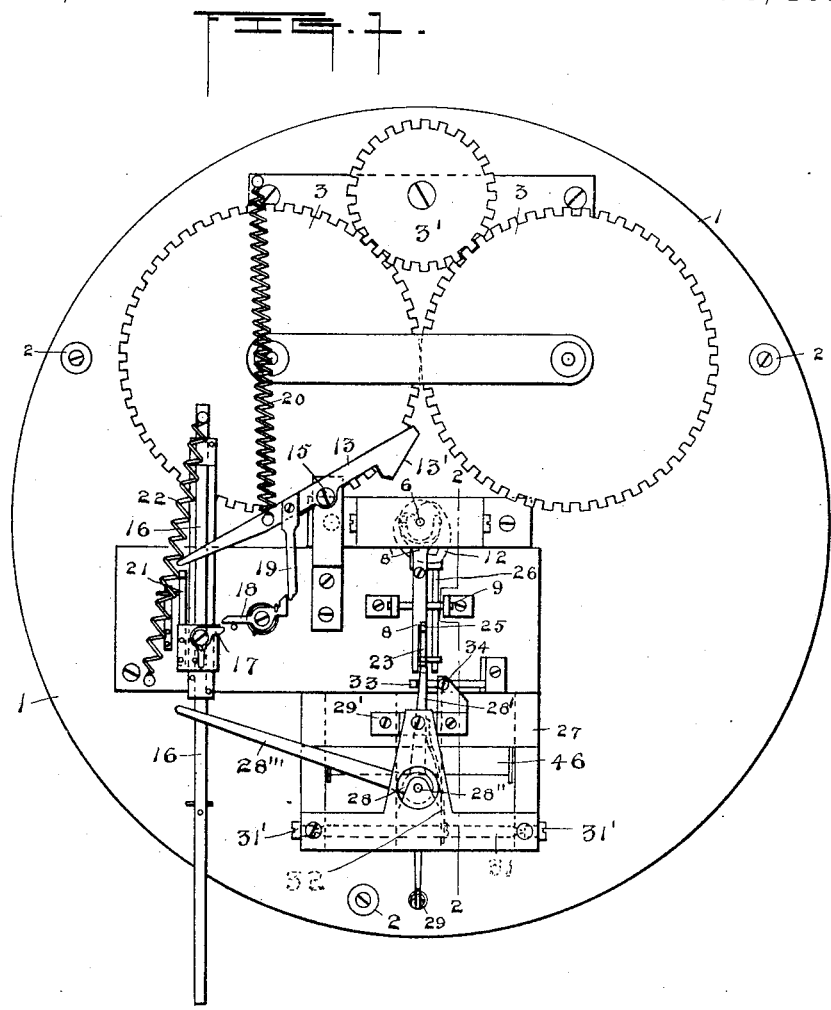
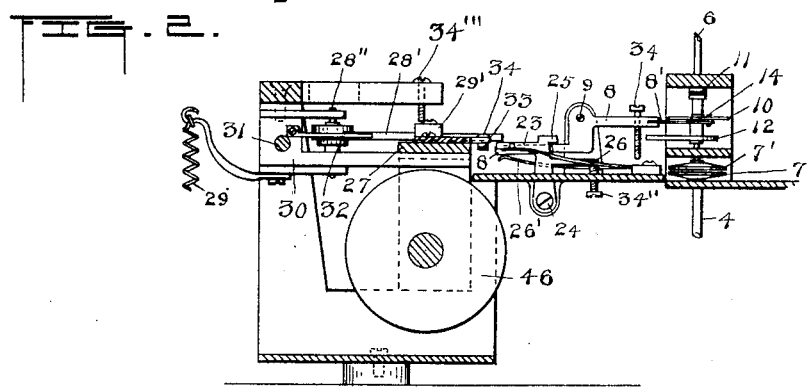
Witnesses
Arch. M. Catlin
Frank D. Blackstone
Inventors
Julien P. Friez
Charles F. Marvin
by
Benj. R. Catlin Attorney

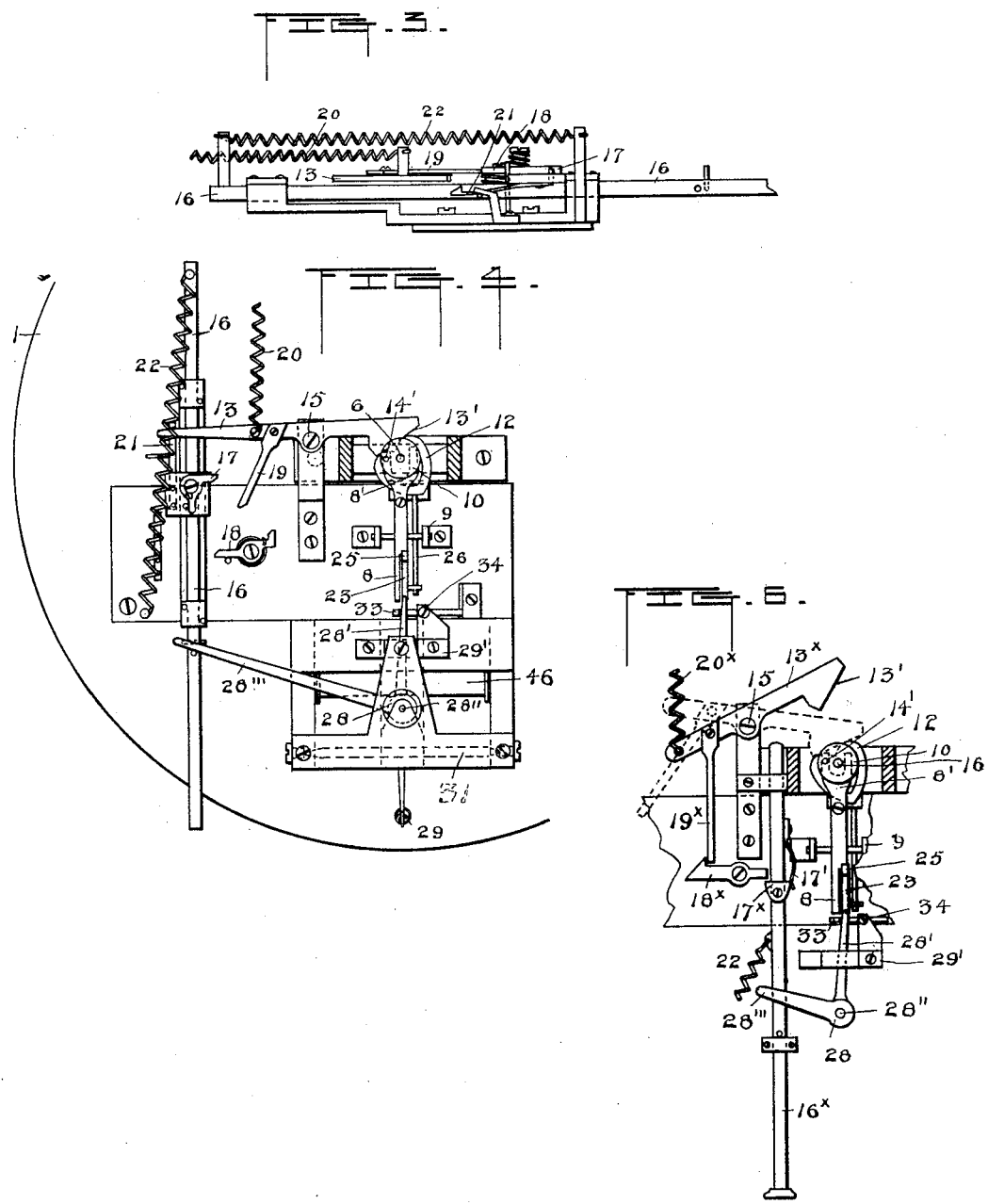

(No Model.) 4 Sheets—Sheet 3.
C. F. MARVIN & J. P. FRIEZ.
DEVICE FOR STARTING OR STOPPING TIME INDICATORS.
No. 533,657. Patented Feb. 5, 1895.
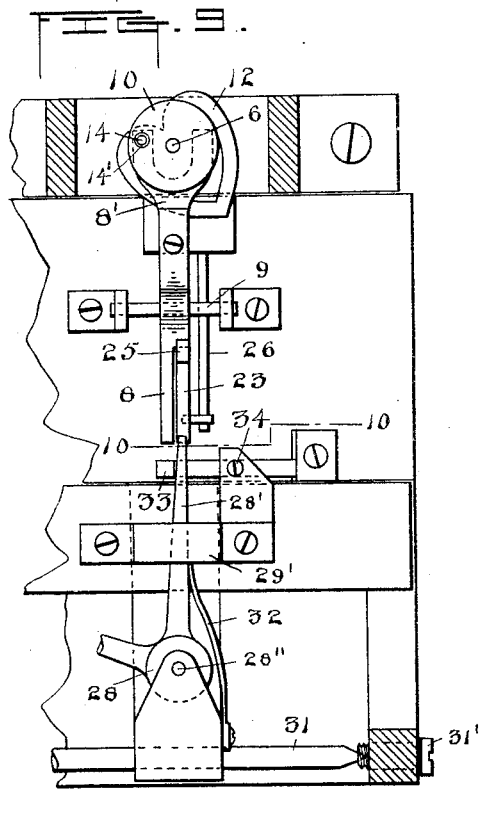
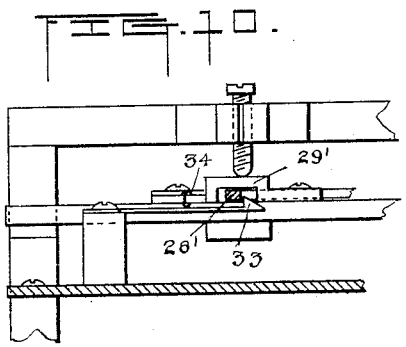
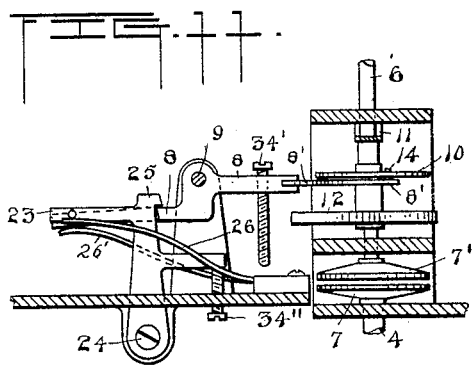
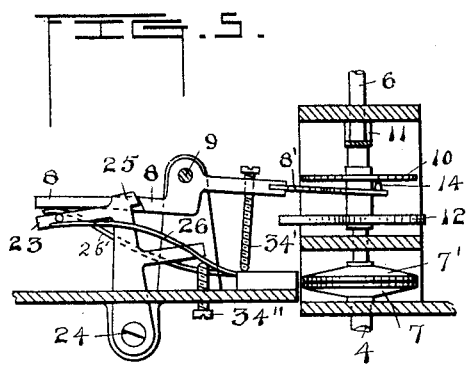
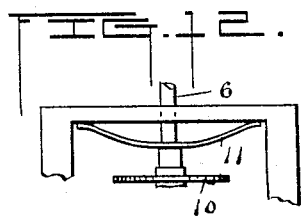
Witnesses
Arch. M. Catlin
Frank D. Blackistone
Inventors
Charles F. Marvin
Julien P. Friez
by Benj. R. Catlin Attorney (No Model.) 4 Sheets—Sheet 4.
C. F. MARVIN & J. P. FRIEZ.
DEVICE FOR STARTING OR STOPPING TIME INDICATORS.
No. 533,657. Patented Feb. 5, 1895.
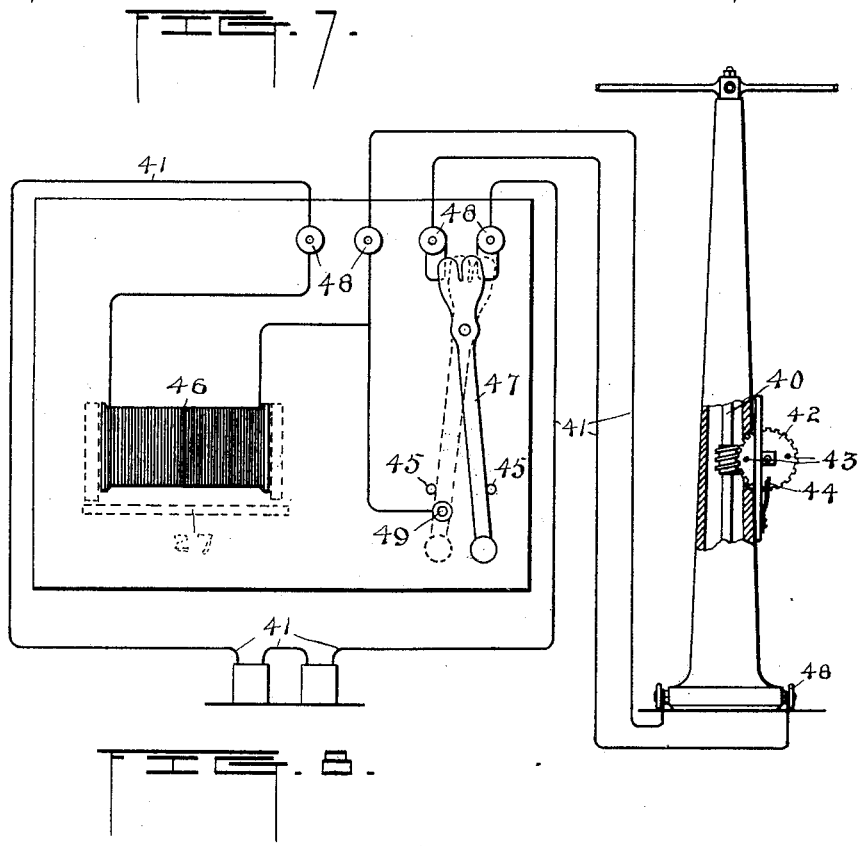
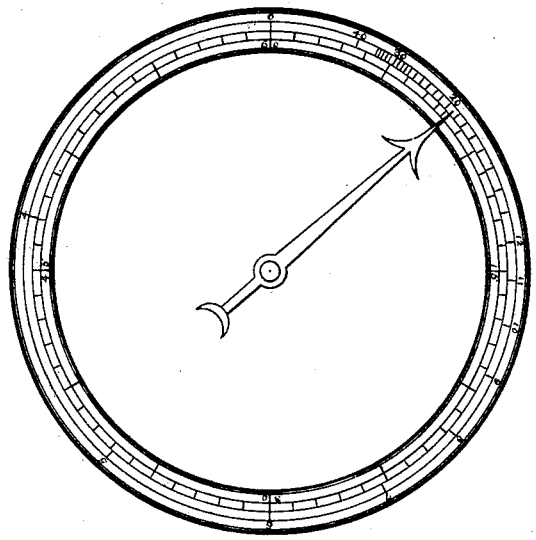
Witnesses
Arch. M. Catlin.
Frank D. Blackstone
Inventors
Charles F. Marvin
Julien P. Friez
by
Benj. R. Catlin Attorney
THE NORRIS PETERS CO., PHOTO-LITHO., WASHINGTON, D. C.

UNITED STATES PATENT OFFICE.

CHARLES F. MARVIN, OF WASHINGTON, DISTRICT OF COLUMBIA, AND JULIEN P. FRIEZ, OF BALTIMORE, MARYLAND.

DEVICE FOR STARTING OR STOPPING TIME-INDICATORS.

SPECIFICATION forming part of Letters Patent No. 533,657, dated February 5, 1895.

Application filed August 10, 1894. Serial No. 519,989. (No model.)

*To all whom it may concern:*

Be it known that we, CHARLES F. MARVIN, a resident of Washington, in the District of Columbia, and JULIEN P. FRIEZ, a resident of Baltimore city, State of Maryland, have invented certain new and useful Improvements in Devices for Starting or Stopping Time-Indicators; and we do hereby declare the following to be a full, clear, and exact description of the invention, such as will enable others skilled in the art to which it pertains to make and use the same.

The invention relates to so-called stop watches or mechanism for indicating durations of time between definite limits; and it has for its objects to increase certainty and exactness of operation and to provide for the combination of the mechanism with an electric circuit or other equivalent means for starting and stopping the time-indicating devices; and the invention consists in the construction hereinafter described and particularly pointed out.

In the accompanying drawings, Figure 1 is a plan. Fig. 2 is a section on line 2—2 of Fig. 1 showing mechanism for starting and stopping a second hand or other time indicating device. Fig. 3 is a side elevation of hand setting mechanism. Fig. 4 is a plan of hand setting mechanism. Fig. 5 is a partial view similar to that in Fig. 2 but showing a different position of the lever for shifting the endwise movable seconds arbor. Fig. 6 is a plan of a modified arrangement of the setting mechanism. Fig. 7 is a view diagrammatic in character of an anemometer and devices for combining it with the stop watch. Fig. 8 is a plan of a dial. Fig. 9 is a partial plan on a larger scale. Fig. 10 is a partial section on line 10—10 of Fig. 9. Fig. 11 is a partial section on line 2—2 of Fig. 1 the scale being enlarged, and Fig. 12 is an enlarged elevation of a detail.

Numeral 1 denotes the back part of a clock, 2 the posts and 3 are gear wheels fixed upon the axes of the main barrel wheels such as usually found in marine or other clocks or watches having two driving springs.

3' is a third wheel imparting motion to wheels 3 and 3 and serving to wind the springs. The opposite end of its arbor (not shown) is adapted to receive a winding key in usual manner. These springs may be understood to indicate any suitable means for imparting uniform motion to an arbor 4, which latter for convenience of description will herein be called the shaft or spindle or seconds shaft or spindle to distinguish it from the endwise movable arbor that carries the seconds pointer. To the end of said spindle is fixed a crown wheel 7 having by preference two hundred and forty teeth equaling the usual number of vibrations or beats per minute of the balance wheel of marine clocks.

6 denotes the endwise movable arbor which carries a pointer so arranged and combined with suitable mechanism and with a dial situated between it and other devices, but not shown in the drawings, as to indicate seconds by preference. Said dial may be provided also with graduations to wind velocities when the stop watch is controlled by an anemometer, revolutions when actuated by a revolving shaft, &c.

Upon the foot of the arbor 6 is fixed a crown wheel 7' with teeth corresponding in number and form to those on wheel 7. These wheels or disks constitute a clutch and are operated by a lever 8 having a fulcrum at 9 and provided with a fork 8' to engage a disk 10 fixed on the arbor 6 and adapted to lift the same when the opposite end of the lever is depressed, thereby moving the clutch disks out of engagement so that the arbor 6 rests, while spindle 4 may continue to rotate.

11 denotes a returning spring to depress the arbor and cause the engagement of the clutch disks whenever the clutch-disengaging lever-arm 8' is moved down away from disk 10 by the action of spring 26'.

14 denotes a locking pin situated on the clutch lever and adapted to enter a suitable opening 14' in disk 10 whenever it is caused to register therewith, by the operation of the cam to be described, with the effect to lock the parts in definite starting position, this operation being insured by the returning spring 11. The locking pin 14 is normally held out of engagement with disk 10 and its opening 14' by said spring 26' on the under side of the opposite end of lever 8 (concealed in plan view). At such time the finger 25 of locking lever 23 is held off from lever 8 by the arm 28' as indicated in Fig. 5, the arm 28' in the position shown in said figure having put spring 26 under tension. The spring 26' at such time is directly behind said spring 26.

In Fig. 2 the arm 28' is shown taken from stop 23 so that spring 26 has operated to raise the locking lever 23 and render its locking finger operative, and the pin 14 is then situated in hole 14'. The two positions of this pin are shown in Figs. 2 and 5 and the hole 14' is indicated in Figs. 4 and 6.

12 denotes a cam made of hard metal fixed on arbor 6 and combined with a lever 13 whereby, when the arbor is free to rotate independently of the driving mechanism, it can be moved to carry the pointer to the initial situation which in the case of an indicator of seconds will be at the 60-point. Said lever is provided with a hard bearing edge 13' adapted to rotate the cam and arbor and bring them to rest when the pointer is in its initial situation. At such time the bearing face 13' bridges the usual re-entrant angle or depression of the heart-cam and bears upon the cam on both sides of said depression for the purpose of avoiding the play and indeterminate situation resulting from the use of a cam-engaging tooth, such as commonly employed, and which is less favorable to the desired exactness requisite for absolute accuracy, and particularly after such tooth, or the walls of its seat in the cam, may have become worn by use. This improved effect is due to the comparatively remote situation of the two bearing points of the face 13' on the cam from the axis of the latter and from each other. This exactness of position is further insured and is rendered independent of the continuous contact of the bearing edge 13' by the action of the locking pin 14 and the opening 14' which action secures the index hand against dislodgment even by violently shaking the stop watch.

One means for operating the cam lever, which has a fulcrum at 15 (see Fig. 1), comprises a push bar 16. 17 denotes a finger carried by said bar and adapted when the bar is pushed in, to move the spring-held trip lever 18 out of engagement with the lever-holding arm 19 attached to the cam-operating lever 13. This lever 18 normally engages the said arm 19 and holds the lever 13 in an inoperative position but when lever 18 is moved to release arm 19 the spring 20 moves lever 13 to rotate the cam as before described and set the hand to sixty degrees or the initial point. The cam setting lever 13 is withdrawn, its spring 20 put under tension and its arm 19 engaged with the spring-held trip lever 18 by spring 22 which acts after bar 16 has been pushed in and immediately upon the release of said bar by the operator, said returning spring 22 having been put under tension for this purpose when bar 16 was pushed in. When the bar is forced in, the spring catch 21 is pushed past lever 13 so that its hook engages said lever in readiness to pull the latter as shown in Fig. 4. When push bar 16 is returned by its spring 22 said spring hook 21 pulls the outer arm of lever 13 until the hook slips from the latter and the parts assume the positions represented in Figs. 1 and 3, the lever being simultaneously locked by the engagement of its arm 19 with lever 18 the latter having been suitably moved upon the retreat of bar 16 by the finger 17 fast on said lever. Thus the pushing in of bar 16 puts the bar-returning spring 22 under tension and the operation of said spring in returning the push bar and moving lever 13 also puts the lever-operating spring 20 under tension in readiness to operate the cam-moving lever 13. The return of the push bar 16 also sets the trip lever 18.

The clutch is operated to secure the starting of the seconds hand by means of the spring 11 which is permitted to act whenever the locking lever 23 is suitably moved to release lever 8. Said locking lever 23, in the form shown, has its fulcrum at 24 and is provided with a finger 25 adapted to engage lever 8 and this locking position of said lever is maintained by a spring 26. (See Fig. 2.) To move said lever 23 and release lever 8 so that spring 11 can act as stated an armature 27 suitably combined with an electro magnet may be employed to depress the bent lever 28 having its fulcrum at 28'' and having one arm 28' loosely connected to the armature by passing under a bridge 29' (as clearly shown in Fig. 6), so formed as to permit a short lateral movement of said arm. The lever 28 and its fulcrum are supported on the rocking plate 30 which carries the armature, said plate being movable about the axis of rod 31 having bearings in the ends of screws 31'.

28''' indicates the other arm of said lever 28 the function of which will be hereinafter described.

32 shown in full lines in Fig. 9 and in dotted lines in Fig. 1 denotes a spring bearing upon the bent lever 28 and tending to move its arm 28' laterally away from the locking lever 23 to a situation immediately over lever 8, and 33 is a spring catch to hold the lever 28 against the action of spring 32.

When the armature is attracted by the magnet, (the parts being properly set,) the lever 28 having its fulcrum 28'' fixed to the pivoted armature or armature carrying plate 30 is carried down upon and moves locking lever 23 and thereby releases lever 8 and permits spring 11 to depress the movable clutch disk and start the seconds-hand arbor. This movement of the armature bends the spring catch 33 down into an inoperative position by the medium of the stop pin 34 (see Figs. 1 and 2) bearing on the top of said catch and so as to relieve arm 28' from said catch on the free end of said spring 33 and permit spring 32 to move lever 28 laterally about its fulcrum and away from over stop lever 23 to a situation over the lever 8. This will take place as soon as the armature leaves the magnet under the operation of its retracting spring 29 such movement of the armature having the effect to lift lever arm 28' above lever 8 at the side of which it was depressed and held while the armature was on the magnet. Arm 28' of lever 28 being thus lifted, released from its catch 33 and swung over lever 8, is in readiness to turn said lever 8 about its pivot 9 with the effect to disengage the clutch disks 7, 7' and disconnect the seconds-hands arbor from its driving spindle and compress spring 11 and arrest the seconds hand and this the armature does when it is next attracted by the magnet. This last operation however leaves the devices inoperative so that the subsequent movements of the armature have no effect upon lever 8 for the reason that said lever is held down out of the path of lever arm 28' by the locking lever 23, the latter being under the influence of spring 26 as indicated in Fig. 2. The spring 11 is then held under compression in readiness to operate the clutch whenever fork 8' of lever 8 is depressed. This fork is mediately depressed by the armature or armature plate 30 when the magnet is energized and turns said plate on its axis 31. This carries down the bent or bell crank lever 28 with the effect to depress its arm 28' upon the adjacent end of stop lever 23 turning the latter on its pivot 24 and lifting finger 25 to unlock lever 8 leaving spring 26' at liberty to turn lever 8 about its pivot 9 to depress fork 8' and permit spring 11 to operate the clutch as stated, pin 14 being at such time disengaged from the hole 14' in disk 10 as shown in Fig. 5 which illustrates the situation of these parts when the clutch is engaged and the seconds hand is moving. These parts are re-set for a repetition of the above described index-starting and stopping operations by the medium of the long arm 28''' of lever 28 which is arranged in the path of bar 16, or of a projection thereon, in manner substantially as indicated and so that when the seconds hand is returned to the 60-point as before described by pushing in the bar the short arm 28' of lever 28 is swung over the locking lever 23 and over the catch spring 33 in readiness to unlock lever 8 as already described.

Several parts illustrated have not been described their construction and operation being obvious. It may be noted however that 34, 34', 34'', 34''' indicate stop pins and screws, the latter being adjustable.

The mechanical details may be varied without departing from the invention it being only essential to preserve the substantial mechanical and operative principles. Thus though the improvement contemplates the use of an electric circuit to start and stop the seconds indicator yet it is not essential to all the advantages of the main improvement. The armature may be moved by any suitable mechanism or by the hand and to that extent may be regarded as standing for a key in this description.

One of the purposes to which the improvement is applicable is the indication of the time consumed by a recorded number of revolutions of the cups or fans of anemometers, such devices being arranged and combined in suitable manner with circuit closers and circuit breakers to determine the currents that magnetize the armatures and thus mediately start and stop the time-duration indicators.

Other devices for setting the mechanism may be employed and a modification of this nature is shown in Fig. 6. In this arrangement as compared with that first described the trip lever $18^\times$ is situated on the opposite side of the setting bar $16^\times$, and the lever arm $19^\times$ is thereby adapted to be fixed to lever $13^\times$ at a greater distance from its fulcrum. Further the setting bar $16^\times$ is situated in the plane of the setting lever $13^\times$ and adapted, when suitably moved, to bear on the outer arm of said lever with the effect to put spring $20^\times$ under tension and to cause the engagement of the trip lever $18^\times$ and the lever arm $19^\times$ which effects are produced by spring 22 in the construction shown in the other figures. To trip the lever $18^\times$ a pawl $17^\times$ pivoted to bar $16^\times$ is provided. 17' denotes a spring to restore this pawl to operative position. A spring catch such as denoted by 21 in other figures is dispensed with by this arrangement the lever $13^\times$ being restored to its initial position and spring $20^\times$ put under tension by the direct action of the setting bar instead of by a spring as in the first above described construction. In this operation it is preferable that the work be done directly by the setting bar instead of mediately and indirectly through a spring such as 22 the action being more easy and certain and the construction simpler. On the other hand it is preferred that the action of a hand-setting device such as a bar 16 or the like operate mediately upon the cam on the index arbor as by spring 20 for the reason that the power of the spring is more limited and more nearly proportioned to the work to be done and therefore less liable to do violence to the delicate index-setting devices than in a construction wherein the hand setting device acts more directly upon the arbor attachments.

It is important that the sequence of the operation after proper setting of the mechanism be such that the first movement of the armature shall start the time index and that its second movement shall stop said index and that any succeeding movement before the mechanism is re-set shall be inoperative in order that the indication of the index and dial may remain undisturbed until read or until another trial is desired.

The sequence of the operations more in detail is as follows: When the parts are suitably set lever arm 28' is over the proximate end of locking lever 23. If then the magnet be energized lever 23 is depressed by arm 28' and lever 8 thus unlocked. Its spring 26' thereupon moves said lever away from disk 10 fast on the seconds-hand arbor, and spring 11 renders the clutch operative by depressing the arbor and clutch disk 7'. The seconds hand being thus connected with the motor runs until the arbor and its clutch disk 7' are raised which is effected by the next movement of the armature which carries arm 28' down upon lever 8 and overcomes its spring 26' elevating the opposite end of said lever with its fork 8' and raising the arbor at the same time allowing spring 26 to cause lever 23 to lock lever 8. The movement of the seconds hand is thus arrested. To provide that arm 28' shall depress levers 23 and 8 in succession as above stated it is necessary that said arm shall be moved laterally from a situation over the latter to one above the former which operation is effected by the spring 32. Said spring is normally neutralized by the spring catch 33 but when arm 28' is carried down upon the locking lever 23 a pin 34 carried by the armature plate holds down or delays said catch in manner so that as the armature and arm 28' rise the latter escapes from the catch and obeys said spring 32 and moves over lever 8 so that the next descent of the armature and arm moves lever 8 and disconnects the seconds arbor from the motor. It is obvious that if at this stage the magnet be energized and the armature and arm 28' be depressed upon lever 8 they will have no further effect upon the seconds arbor, for said lever 8 is at such time locked in the position where it holds up said arbor and the arm 28' cannot be operated to alter the lock until it is moved over the locking lever 23 which can only be done by re-setting the mechanism by the push bar. The completion of the electric circuit whether accidental or by intermeddling will not disturb the indication previously secured. To secure an indication of the duration of time it is therefore only necessary to suitably close the electric circuit at the beginning and at the close of the interval and the time will be indicated on the dial undisturbed by any subsequent completions of the circuit unless the device has been reset.

The improvement is adapted for various purposes such as to indicate the velocity of wind.

In Fig. 7, which is partly diagrammatic in character, 40 indicates a revolving spindle of an anemometer and 42 a gear wheel driven by a worm or other gear fixed on the anemometer spindle. 43 is a circuit closing pin carried by gear 42, and 44 a spring contact finger situated in the path of said pin. 41 indicates the wires of an electric circuit and 46 and 27 the coil and armature respectively of an electric magnet. 47 is a spring switch key and 48 are binding posts. 45 denotes stops for the key and 49 is a contact whereby the anemometer is cut out of the circuit by depressing the switch bar 47 thereon, said bar having been moved to the position indicated by dotted lines for the purpose, which movement breaks the circuit through the left arm of the bifurcated end of the switch bar and makes the circuit through the other arm as indicated in Fig. 7. The construction is such that the operator can start or stop the current and by consequence the seconds index at will and so as to measure any intervals of time as desired. It is also such that the circuit through the wires 41 is closed by the pin 43 coming in contact with the spring 44 after a predetermined number of rotations of the anemometer axis or spindle. On the dial shown in Fig. 8 the inner circle of figures indicates seconds. The outer circle indicates velocities in terms of miles per hour corresponding to the seconds indicated during any predetermined number of rotations of the anemometer spindle.

If for example the anemometer be geared to rotate ten times from an initial or starting point and then adapted to close the electric circuit by the contact of pin 43 and spring 44 whereby the armature above described is moved and the seconds index stopped the time occupied by the ten rotations will be indicated on the dial in seconds. Let it be assumed for example that in a particular case the ten rotations occupy thirty seconds. It will be seen by referring to the dial that the indication corresponds to a velocity of six miles per hour that fact having been experimentally ascertained to make the dial of the particular anemometer to be properly marked for the correct indication.

We are aware that an electro-magnet has been employed to synchronize clocks by suitable intermediate devices adapted to disengage a clutch comprising two crown wheels one of which is locked to the arbor of an index and also to relieve the clock work from the detaining action of an escapement with the effect to rapidly rotate the seconds hand until suitably stopped and we do not claim such construction.

It is characteristic of our improvement as respects the locking of the arbor that it is unlocked by the means which cause the clutch disks to engage and simultaneously with such engagement.

We are aware that a seconds-hand arbor of a chronographic attachment for a watch has been combined with a trip wheel adapted by intermediate mechanism to connect said arbor with the watch mechanism when suitably moved by a button and lever pawl. In such constructions manipulation by an observer first connects the seconds arbor with the watch mechanism and a second manipulation disconnects the same and a third resets the seconds-arbor at zero. Our improvement provides that the starting and stopping mechanism may be operated in the absence of an observer and without personal manipulation, that is, automatically. In said prior device the seconds hand arbor was also combined with a cam thereon having a straight bearing and affording a long continuous contact with a re-setting lever. In this particular our improvement provides in such a combination that the lever shall in operation bridge a reentrant angle or curve in the cam substantially as shown and shall have two distinct and remote points of contact as for example with two lobes of a heart shaped cam. By this construction the danger of the interference between the lever and cam, of foreign objects, such as a hair or particle of wood, metal or other material liable to be deposited by air currents or otherwise is reduced to a minimum and practically nullified. Even if an obstruction should be lodged on one of our separated bearings its disturbing effect would be less than by a similar lodgment near the center of the continuous bearing above described.

Having thus described our invention, what we claim is—

1. The combination in a clock or the like of a spindle, and devices for rotating it with an arbor carrying a pointer, an electro magnet, its armature, and devices whereby a movement of the armature toward the magnet under the influence of a single electric impulse connects the arbor and spindle and starts the rotation of the arbor, and devices whereby said spindle and arbor may be disconnected at any desired time thereafter whenever the armature is next moved by a like impulse, substantially as set forth.

2. The combination in a clock or the like of a spindle, and devices for rotating it, with an arbor carrying a pointer, an electro magnet, its armature, devices whereby a movement of the armature toward the magnet under the influence of a single electric impulse connects the arbor and spindle and starts the rotation of the arbor, and devices whereby said spindle and arbor may be disconnected at any desired time thereafter and whenever the armature is next moved by a like impulse, said devices consisting of a clutch, a clutch disconnecting lever, a clutch connecting spring, and a lock for the said lever adapted to hold the clutch inoperative and to be released by the armature, the armature being adapted first to release the lock and then to disconnect the clutch at will, substantially as set forth.

3. The combination in a clock or the like, of a spindle, the arbor and pointer, the clutch disks, the clutch disconnecting lever, a clutch closing spring, a laterally movable arm 28' adapted alternately to bear on the clutch-disconnecting lever and then bear at will on the clutch lever, the armature being adapted to move said bar against the locking lever to release the clutch-disconnecting lever from said lock and to disconnect the clutch and a spring to move the locking lever to relock said disconnecting lever, substantially as set forth 4. The combination of the clutch, the clutch connecting spring, the arm 28' for alternately unlocking the clutch-disconnecting lever and moving said lever 8 to disconnect the clutch, the spring catch for arm 28' to hold it in inoperative connection, a pointer, and re-setting mechanism adapted to move the pointer to an initial position and to simultaneously re-set arm 28' in readiness to unlock the clutch-disconnecting lever, substantially as set forth.

5. In a stop watch the re-setting bar, the arbor carrying an index pointer and a cam, the cam-operating lever, suitable returning springs, and an intermediate trip lever 18 adapted to lock the cam-operating lever, said bar having a finger 17 to operate the trip lever and a spring catch 21 carried by the re-setting bar to withdraw the cam-operating lever and put its spring under tension and lock said lever, substantially as set forth.

6. The combination with a stop watch or the like of an index finger, automatically operating mechanism adapted to connect said clock work and finger in the absence of an observer to start the latter and adapted subsequently to automatically disconnect said parts to stop the same at a time determined by said mechanism said index stopping mechanism being rendered inoperative to start again after a stop without re-setting thereof, and distinct re-setting devices, substantially as set forth.

7. In combination with a revolving shaft as of an anemometer, an electric circuit, a circuit closer automatically operated by the rotations of the shaft, an electro magnet in the circuit and a time index adapted to be started by the movement of the armature upon the completion of the circuit and to be stopped by the next subsequent completion of the circuit the parts being thereby left independent of the electric circuit, substantially as set forth.

8. In combination with a revolving shaft or spindle as of an anemometer, an electric circuit, a circuit closer automatically operated by the rotations of the shaft, an electro magnet in the circuit, a time index adapted to be started by the movement of the armature upon the completion of the circuit and to be stopped by the next subsequent completion, and a dial marked to indicate by the movement of the index the duration of the time between the first and second closing of the circuit, said dial being also marked to indicate velocities corresponding to that of the rotating shaft, substantially as set forth.

9. In a stop watch or the like, a re-setting bar, an arbor supporting an index and cam, a cam setting lever, a lock to hold said lever off from the cam, a spring to operate the lever when released from the lock, said setting bar being adapted to trip the lock and permit the spring to move the lever to set the cam, and also adapted by its further movement to move said lever off the cam and lock it, and also to compress its spring, substantially as set forth.

10. In combination, the driving mechanism, the index arbor having a cam, devices for setting said cam, arbor and index, and a device for disconnecting said arbor with the driving mechanism provided with a pin 14, and a disk fixed on the arbor and provided with a hole 14' to receive said pin and hold the parts in fixed relation when the index is set and until the clutch is made operative, and means for withdrawing the pin to permit the rotation of the arbor when clutched, substantially as set forth.

In testimony whereof we have signed this specification in the presence of two subscribing witnesses.

CHARLES F. MARVIN.
JULIEN P. FRIEZ.

Witnesses:
A. J. HENRY,
P. C. DAY.